US009607408B2

(12) United States Patent
Furches et al.

(10) Patent No.: US 9,607,408 B2
(45) Date of Patent: Mar. 28, 2017

(54) RENDERING SEMI-TRANSPARENT USER INTERFACE ELEMENTS

(75) Inventors: Elizabeth Caroline Furches, San Francisco, CA (US); Mike Matas, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1722 days.

(21) Appl. No.: 12/135,948

(22) Filed: Jun. 9, 2008

(65) Prior Publication Data
US 2008/0307342 A1    Dec. 11, 2008

Related U.S. Application Data

(60) Provisional application No. 60/942,985, filed on Jun. 8, 2007.

(51) Int. Cl.
*G06T 11/00*    (2006.01)

(52) U.S. Cl.
CPC .................... *G06T 11/00* (2013.01)

(58) Field of Classification Search
CPC ............... G06T 11/00; G06F 3/0481
USPC .................................. 715/768, 764
See application file for complete search history.

(56) References Cited

U.S. PATENT DOCUMENTS

| | | | |
|---|---|---|---|
| 5,867,595 A * | 2/1999 | Cymbalski .................... | 382/192 |
| 6,118,427 A * | 9/2000 | Buxton et al. ................ | 345/629 |
| 6,429,883 B1 * | 8/2002 | Plow et al. .................... | 715/768 |
| 7,429,993 B2 * | 9/2008 | Hui ................................ | 345/629 |
| 7,864,197 B2 * | 1/2011 | Brown .......................... | 345/629 |
| 2002/0149600 A1 * | 10/2002 | Van Splunter et al. ....... | 345/592 |
| 2005/0044500 A1 * | 2/2005 | Orimoto et al. .............. | 715/706 |
| 2005/0047659 A1 * | 3/2005 | Tanaka .......................... | 382/170 |
| 2005/0213853 A1 * | 9/2005 | Maier et al. .................. | 382/302 |
| 2006/0244756 A1 * | 11/2006 | Rublee .......................... | 345/581 |
| 2007/0219878 A1 * | 9/2007 | Gudjonsson et al. .......... | 705/28 |

OTHER PUBLICATIONS

Defintion of brightness: http://dictionary.reference.com/browse/brightness?s=t corresponding brightness.pdf document is attached.*
Definition of bright: bright.pdf document attached, http://dictionary.reverso.net/english-synonyms/bright with corresponding bright2.pdf document attached.*
Definition of transparent: http://dictionary.reference.com/browse/transparent?s=t with corresponding transparent.pdf document attached.*
Defintion of opaque: http://dictionary.reference.com/browse/opaque?s=t with corresponding opaque.pdf document attached.*

* cited by examiner

*Primary Examiner* — Angie Badawi
(74) *Attorney, Agent, or Firm* — Blank Rome LLP

(57) ABSTRACT

A computer-implemented method includes: determining an intensity of a visual effect to be applied to a user interface element; adjusting the intensity of the visual effect based on a characteristic feature of a background area; and rendering the user interface element based on the adjusted intensity of the visual effect.

18 Claims, 8 Drawing Sheets

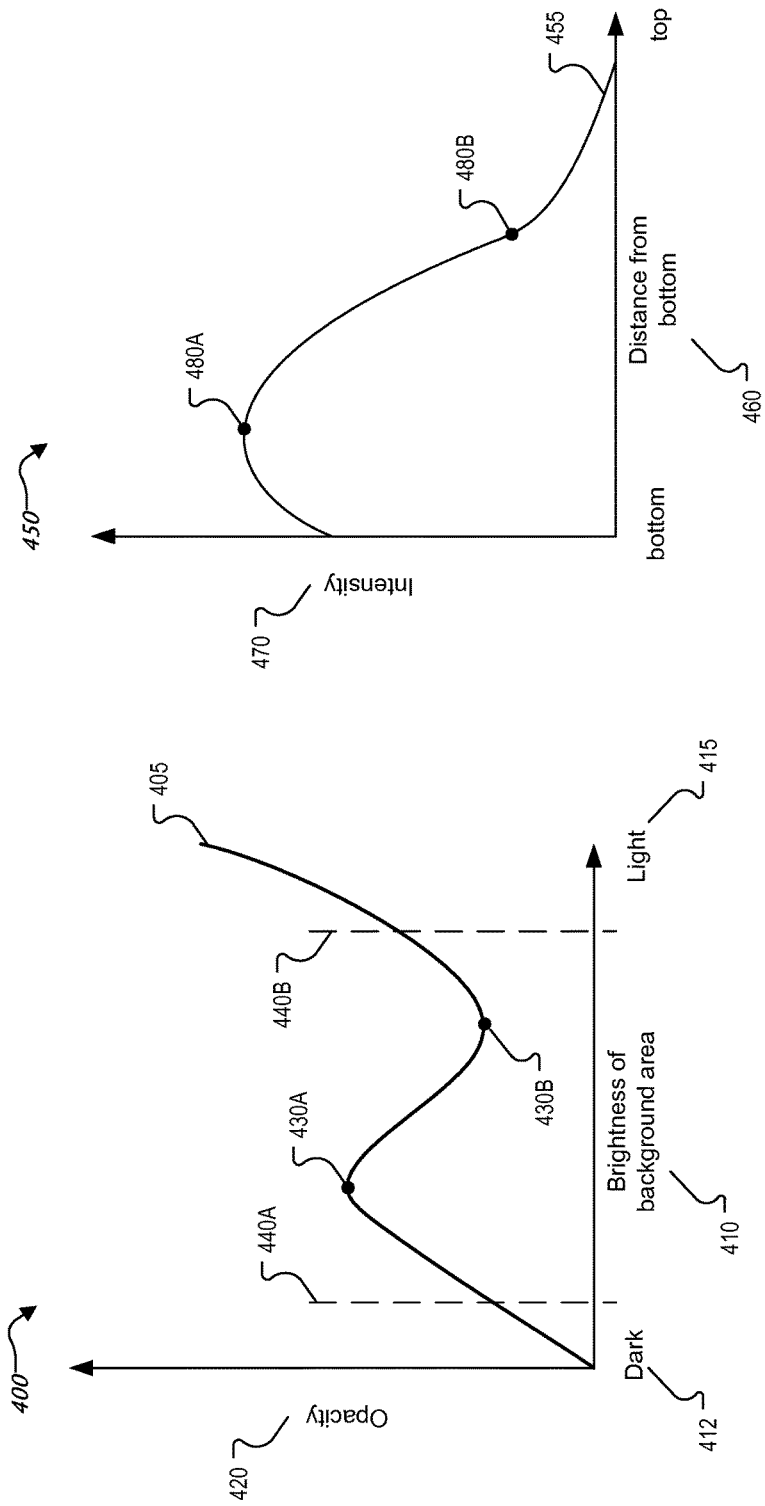

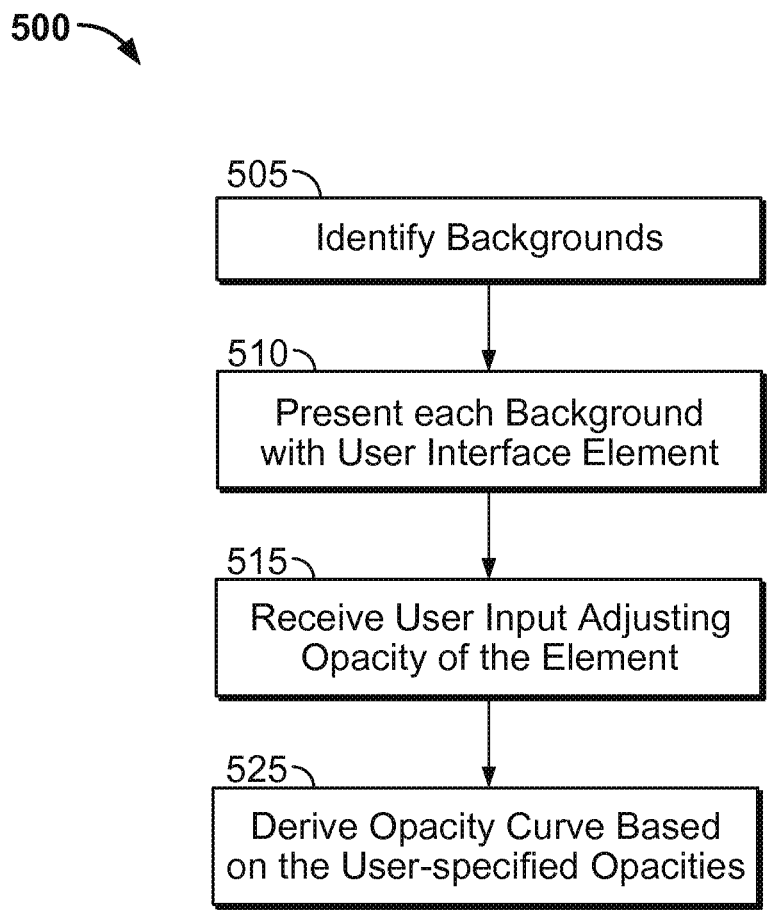
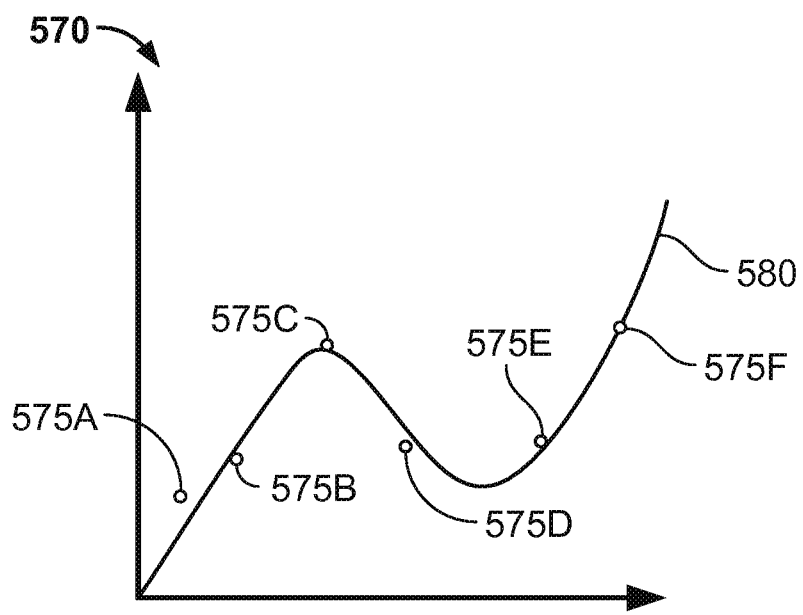
FIG. 5B

RENDERING SEMI-TRANSPARENT USER INTERFACE ELEMENTS

RELATED APPLICATIONS

This application claims the benefit under 35 U.S.C. §119 of U.S. Provisional Application No. 60/942,985, titled "Rendering Semi-Transparent User Interface Elements," filed Jun. 8, 2007, which is incorporated by reference herein in its entirety.

BACKGROUND

This disclosure generally relates to presenting graphical information.

A graphical user interface generally includes multiple user interface elements that each represents individual components of the interface. Each user interface element has particular visual properties such as color and shape that together describe the appearance of the user interface element in the graphical user interface. When the graphical user interface is presented, each user interface element is usually drawn so that any part of one element that overlaps another element completely occludes the other element. In some systems, a user interface element is associated with a transparency value describing the extent to which the user interface element is semi-transparent. This transparency value is used to render the user interface element so that whatever the element happens to occlude partially appears through the element. For any given transparency value, however, a user interface element may, to a user, appear significantly different depending only on colors in the area partially occluded by the semi-transparent user interface element.

SUMMARY

A computer-implemented method includes: determining an intensity of a visual effect to be applied to a user interface element; adjusting the intensity of the visual effect based on a characteristic feature of a background area; and rendering the user interface element based on the adjusted intensity of the visual effect.

Particular embodiments of the subject matter described in this specification can be implemented to realize one or more of the following advantages. A semi-transparent graphical user interface element has a consistent appearance no matter what background is displayed behind the element. Text or other information that is displayed in the element is consistently legible because of consistent contrast between the text and the element.

The details of one or more embodiments of the invention are set forth in the accompanying drawings and the description below. Other features, aspects, and advantages of the invention will become apparent from the description, the drawings, and the claims.

DESCRIPTION OF DRAWINGS

FIG. 4A is an example plot for determining the opacity of a user interface element based on a characteristic feature of the background.

FIG. 4B is an example plot for determining the intensity of a gradient effect based on a feature of the user interface element.

FIGS. 5A-5B illustrate derivation of the plot in FIG. 4A by example from empirical data.

Like reference numbers and designations in the various drawings indicate like elements.

DETAILED DESCRIPTION

Figure 1:
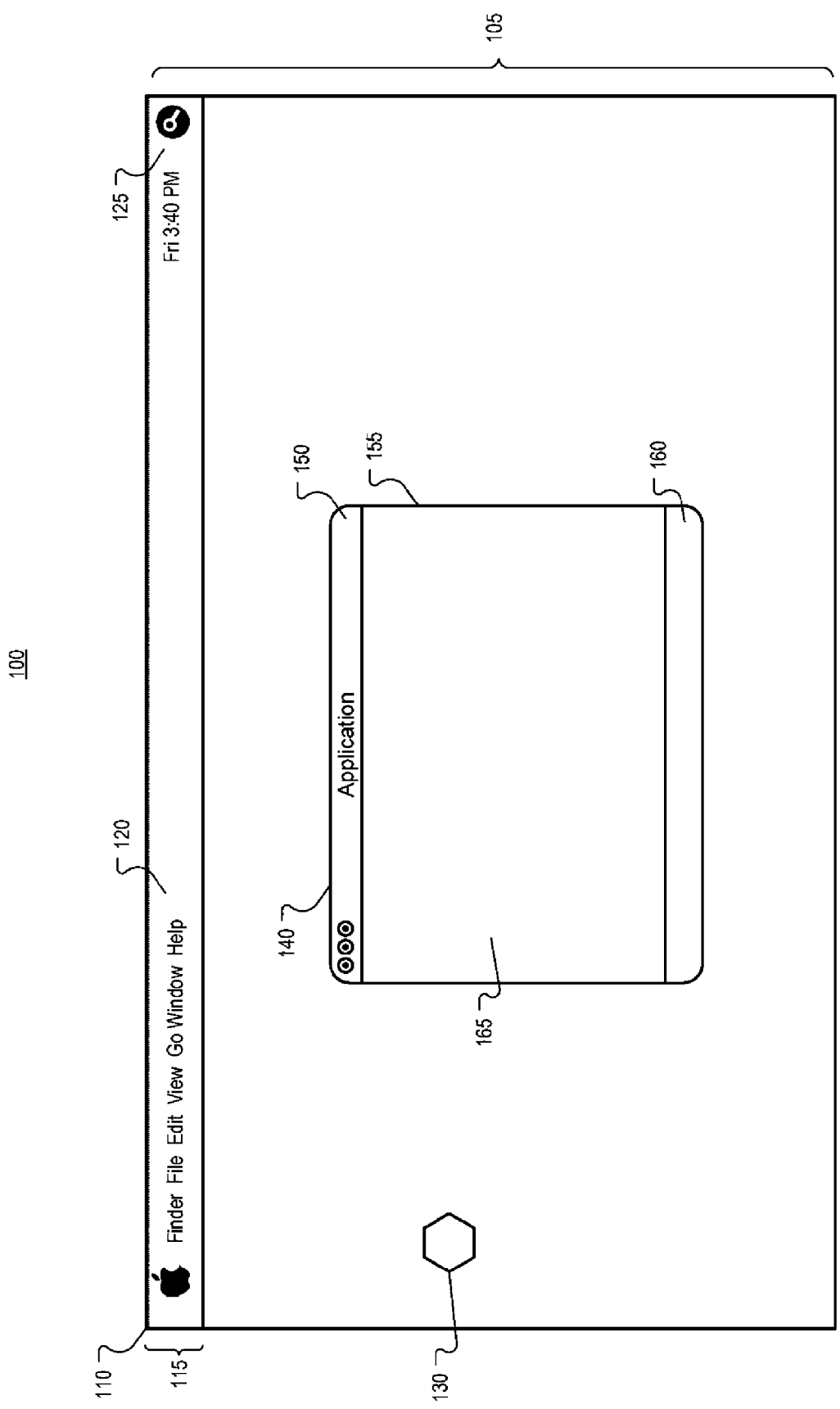
FIG. 1 is a screenshot of user interface elements displayed over a light background.

FIG. 1 is a screenshot 100 of user interface elements displayed over a light background 105. The background 105 is a part of a graphical user interface. The graphical user interface provides a desktop or, more generally, a display oriented environment that typically contains a variety of user interface elements including text, icons and windows. A user interacts with some of these user interface elements (e.g., windows 140, menu bar 110 and icons 130) to manage and operate applications. The background 105, sometimes referred to as a desktop background or wallpaper, is typically an image or pattern that represents the surface of the desktop. In some implementations, all other visual elements normally overlap the background 105, giving a user a sense of depth. Graphical user interfaces having desktop backgrounds includes the Mac OS X® operating system from Apple Inc. of Cupertino, Calif. and the Microsoft Windows® operating system from Microsoft Corporation of Redmond, Wash.

Each individual user interface element can generally include several parts. For example, the menu bar 110 user interface element includes a drawing area 115, text 120 that represents menu items and components such as an icon 125. The drawing area 115 represents the area over which the user interface element can draw or otherwise render images or text so as to present information to a user. A window 140 can include other parts including a title bar 150, border 155, drawing surface 165 and a control area 160 (e.g., a status bar, icon pallet or other user controls). These parts are typically rendered as a part of the graphical user interface so that the elements can be made visible to a user (e.g., by way of a display device). Rendering refers to the adjustment of color values for pixels in a raster of pixels where the raster of pixels represents an image of the graphical user interface that is being (or is about to be) displayed to the user. The rendering of a user interface element is sometimes referred to as rasterizing, painting, drawing or compositing.

In general, any user interface element or part thereof in the graphical user interface can be drawn semi-transparently. When a user interface element is drawn semi-transparently, then whatever area of the graphical user interface that would be displayed under (e.g., occluded by) the user interface element appears at least partially through the user interface element. A background area refers to the part of the graphical user interface that is occluded by the user interface element. Generally, the background area has the same shape as the user interface element and describes the visual appearance of the area that would be displayed if the user interface element did not appear in the graphical user interface at all.

The background 105 represents the surface of the desktop. If a user interface element is rendered in the graphical user interface, then the element must at least occlude part of the background 105. In some implementations, the element may also occlude other parts of the user interface (e.g., icons, background windows or other visual components of the graphical user interface). For example, the drawing surface 115 of the menu bar 110 is drawn semi-transparently so that the part of the background 105 occluded by the menu bar 10 partly appears through the menu bar 110. A user interface element that is drawn semi-transparently is not only aesthetically pleasing to most users, but can advantageously make the element appear to hover above the desktop, further emphasizing a sense of depth to the user.

In some implementations, an opacity or alpha value is used to describe the degree to which a user interface element (or part thereof) is transparent or opaque. For example the drawing surface 115 of the menu bar 110 can be associated with the color white (or, in general, some other color, pattern or image), but is also associated with a transparency value indicating, for example, that the drawing surface 115 is 50% transparent. When the drawing surface 115, associated with the color white, is rendered, a transparency effect can be applied. For example, the color white associated with the drawing surface 115 can be blended with the background area based on the specified 50% transparency. The opacity value of a user interface element is but one visual effect that affects the appearance of the user interface element in the graphical user interface. In other implementations, other visual effects can be used to achieve semi-transparency. For example, to draw the drawing surface 115 of the menu bar, the background area can be blurred, pixilated, tinted, or subjected to other optical effects. In some implementations, several visual effects can be composed to produce a compound visual effect.

Figure 2A:
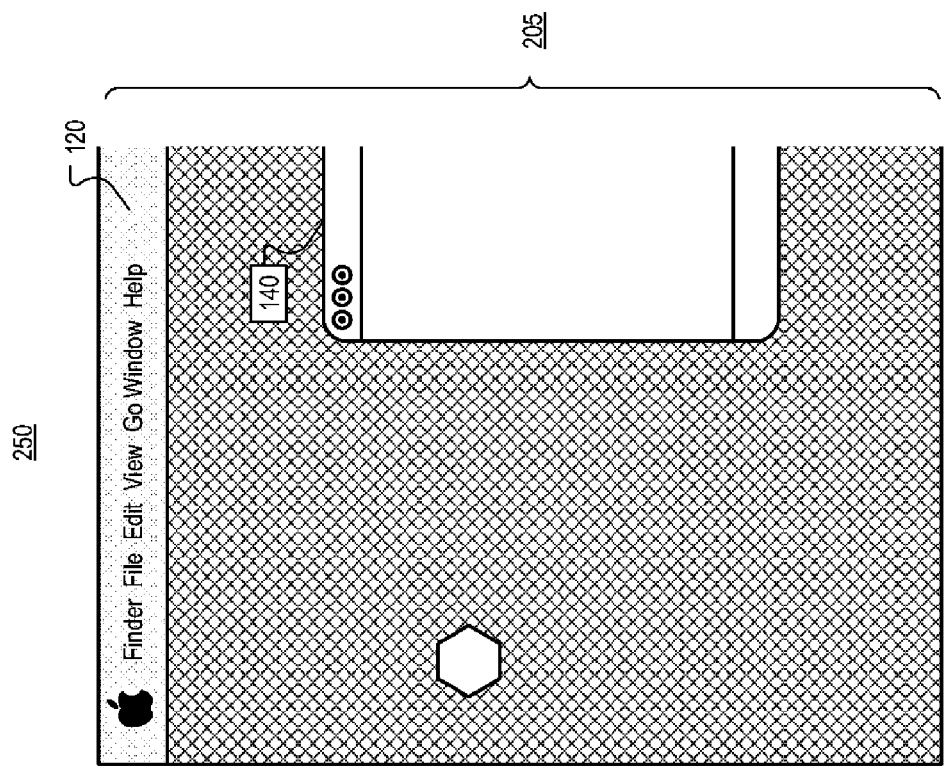
FIGS. 2A-2B are screenshots of a user interface element displayed over a dark background.
Figure 2B:
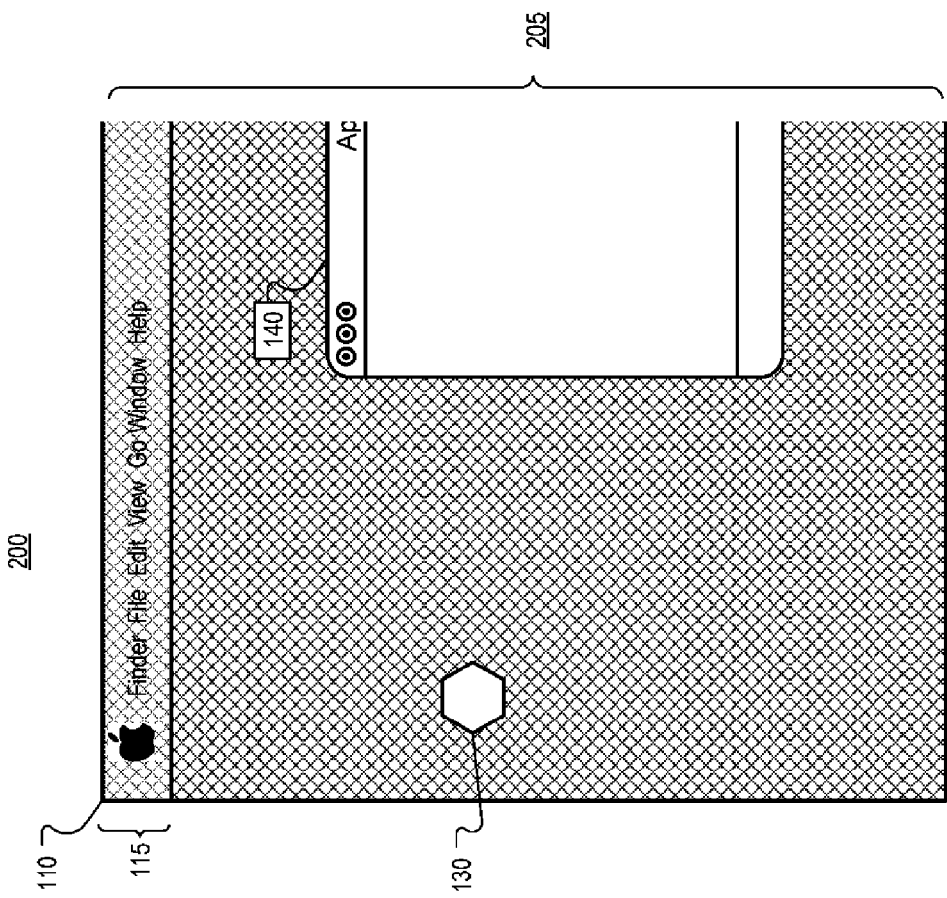

The visual appearance of a semi-transparent user interface element can differ considerably depending on the color of whatever is behind the element. For example, the menu bar 110 drawn over the light background 105 appears, overall, to be a particular shade of white. FIGS. 2A-2B are screenshots of the same user interface elements displayed over a dark background 205. In the screenshot 200, the menu bar 110 is drawn over the dark background 205 using the same opacity value as when the menu bar was drawn over the light background 105. In comparison, the menu bar 110 in the screenshot 200 appears darker than in the screenshot 100. The seemingly inconsistent appearance of an otherwise static user interface element over varying backgrounds may be disconcerting to some users. Instead, the visual effect of such element is adjusted based on visual characteristics (e.g., brightness or darkness) of the background area over which the element is presented. The background area can be sampled and analyzed to determine visual characteristics of the background area. For example, pixels of the background area can be averaged together to determine an average color value. Alternatively, gradient values can be determined that identify the extent to which color changes occur in the background area. This gradient value is sometimes considered a metric of complexity of the background area. Histograms can be derived that illustrate the frequency of particular color or color ranges. A system uses these values (e.g., color averages, gradient metrics or the shape of a histogram) to adjust a visual effect of the user interface element. In the screenshot 250, the same menu bar 110 is drawn over the same dark background 205 using an opacity value that has been adjusted based on the darkness of the background area of the menu bar. The appearance of the menu bar 110, in particular the contrast between the text 120 and the drawing surface 115 of the menu bar, is more consistent with that of the same menu bar drawn over the light background 105.

In general, the visual effect of a semi-transparent user interface element is varied based on the characteristics of the background area so that the appearance of the element is consistent no matter what background the element is rendered over. In the remaining discussion, the menu bar 110 is used as an example user interface element, however in general, the visual characteristics of any user interface element can be adjusted based on the visual characteristics of a background area. For example, some or all of the user interface elements of the application 140 can similarly be adjusted so as to appear consistent over a variety of backgrounds.

Figure 3:
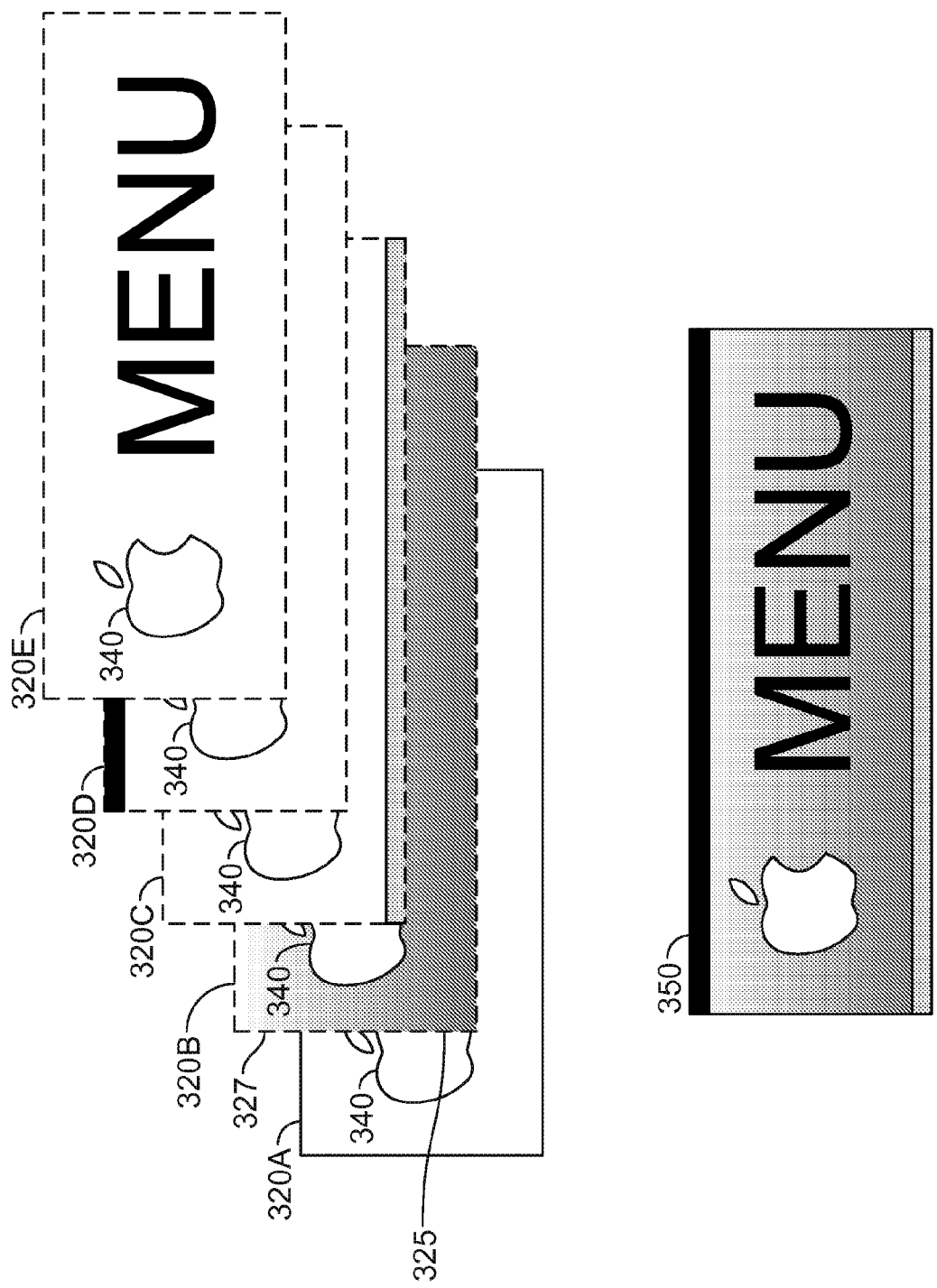
FIG. 3 is a diagram of compositional layers of an example user interface element.

FIG. 3 is a diagram of compositional layers 320A-E of an example user interface element, a menu bar. A first layer 320A, the color layer of the drawing surface of the menu bar represents the color of the menu bar. In some implementations, the drawing surface of the menu bar is assumed to have a uniform color. In other implementations, the drawing surface of the menu bar can be non-uniform (e.g., the drawing surface depicts an image or repeating pattern). The first layer 320A includes an opacity value describing the drawing surface's degree of opacity. A desired opacity value can be initially specified, but the effective opacity value can be determined based on the visual characteristics of the background area over which the menu bar will be displayed. In one implementation, for each pixel covered by the user interface element, the current color of a pixel (e.g., its background color) is blended with the color specified in first layer, where the blending is based on the effective opacity value. Further information about how the opacity value of a user interface element is adjusted based on visual characteristics of the background area is described in reference to FIG. 4A.

The second layer 320B is a gradient visual effect layer which is used to apply a visual effect that varies over a spatial feature (e.g., height or width) of the user interface element. The second layer is associated with a particular visual effect that further affects the colors of pixels covered by the user interface element. The visual effect can include color burning, color dodging, saturation adjustment, hue adjustment, brightness adjustment, contrast adjustment or blurring. The extent to which the visual effect affects any particular pixel covered by the user interface element is determined by, for example, a gradient that varies across the surface (e.g., height or width) of the user interface element. For example, the gradient associated with the second layer 320B specifies that the visual effect is maximized at a point 325 and is minimized at a point 327. Thus, a pixel at point 325 is affected to a greater degree by the visual effect than a pixel at point 327.

The layer 320C is a border pixel that emphasizes the edge of the user interface element. The color of the border pixel is determined based on the visual characteristics of the background area. For example, the color of a line of pixels that spans the bottom of the menu bar is selected based on the brightness of the background area. The color is selected to be brighter than the average color of the background area. Similarly, the layer 320D is a border pixel emphasizing the top edge of the menu bar. In some implementations, the color of the top edge of the menu bar is predetermined or selected based on color characteristics of the background area. In some implementations additional layers can be included, each adding separate visual elements to the final appearance of the user interface element. These layers can further be associated with a specified transparency value that affects how the layers are blended together in the final appearance of the user interface element.

A fifth layer 320E is an information layer representing other user interface elements (e.g., text, symbols and icons) of the user interface element. In general, this layer is rendered last and is typically rendered opaquely so that the information being presented in the user interface element completely occludes the background area. The rendering of this layer, as with the other layers, can be subject to further processing for generating a desirable visual effect. For example, text and icons can be rendered multiple times at multiple offsets and colors to produce an embossed or raised appearance or to generate a shadow or glow effect.

In some implementations, a masked area 340 can be defined. The masked area specifies an area of the user interface element that is not affected by any of the individual layers 320A-E. The masked area 340 can be associated with a masked visual representation that is used in lieu of the representation derived from the layers of the user interface element. The masked visual representation is drawn into the masked area 340 when rendering the final appearance of the user interface element. The mask visual representation can correspond to a solid color, a particular icon, image or sprite. In some implementations, the mask visual representation can be derived from several layers that can depend on a visual characteristic of the background. The specification of layers and the derivation of the visual representation can be effected in a fashion analogous to that of a user interface element. In other implementations, a sprite specifying the appearance of the mask visual representation can include transparent or semi-transparent areas (e.g., per pixel alpha values). When such a sprite is rendered into the masked area at least part of the background can appear through the transparent or semitransparent areas specified in the sprite.

Each layer 320A-E can, in one implementation, be composited in order by blending each respective layer with the background area. The rendering of layers yields a final appearance 350 of the user interface element that appears consistently semi-transparent over varying backgrounds. Note that each layer is shown as a separate and complete layer for illustration purposes. In some implementations, the appearance of the user interface element is achieved without distinctly storing, rendering or compositing separate layers. For example, the same final appearance 350 of the user interface element can be rendered given only a background color, a visual effect, border colors and the desired text and icons to present with the user interface element.

FIG. 4A is an example plot 400 for determining the opacity of a user interface element based on a characteristic feature of the background area. The background area is sampled to determine/measure a characteristic feature of the background area. In some implementations the characteristic feature is the brightness 410, luminosity or complexity of the background area, which can be plotted along the x-axis. Depending on the particular background area, the feature ranges between some maximal value 415 and a minimal value 412. The curve 405 describes an opacity value 420 in the y-axis given a value of the feature for the current background area. For example, where the characteristic feature is brightness, when the brightness of the background area is determined to be low, such as at point 440A, the opacity given by the curve 405 is correspondingly low. At a point 440B, wherein the brightness of the background area is determined to be relatively more bright (compared to point 440A), the opacity given by the curve 405 is slightly higher. The extent to which a user interface element is made transparent given a particular background area need not be described by a simple linear scale. Indeed a non-linear curve can yield more pleasing results.

In general the curve 405 can be described by one or more points (e.g., points 430A-B). The curve 405 can be generated given the one or more points by interpolating between the points. In other implementations, the points describe a Bezier curve. The points 430A-B can be pre-specified by an expert user or, alternatively, the points can be derived from a collection of empirical data samples, as described in association with FIGS. 5A-5B.

FIG. 4B is an example plot 450 for determining the intensity of a gradient effect based on a spatial feature of the user interface element. In some implementations, the spatial feature is the vertical distance relative to the top or bottom edge of the user interface element. In other implementations, the spatial feature is the horizontal distance relative to a left or right edge of the user interface. Alternatively, the spatial feature can be a radial distance from a specified point relative to the user interface element, a diagonal position or some other value that varies over the area of the user interface element. Given a value measuring the spatial feature 460 of a point on the user interface element, the intensity 470 of the gradient effect is given by the curve 455. For example, where the spatial feature is the vertical distance relative to the bottom of user interface element, at a point 480A that is spatially close to the bottom of the element the intensity given by the curve 455 is a high value. The high value is much higher than an intensity value given by the curve 455 at a point 480B spatially close to the top of the element. In some implementations, the point 480A can be used to specify the shape (e.g., a value where the intensity is maximal) of the curve 455.

Figure 5A:
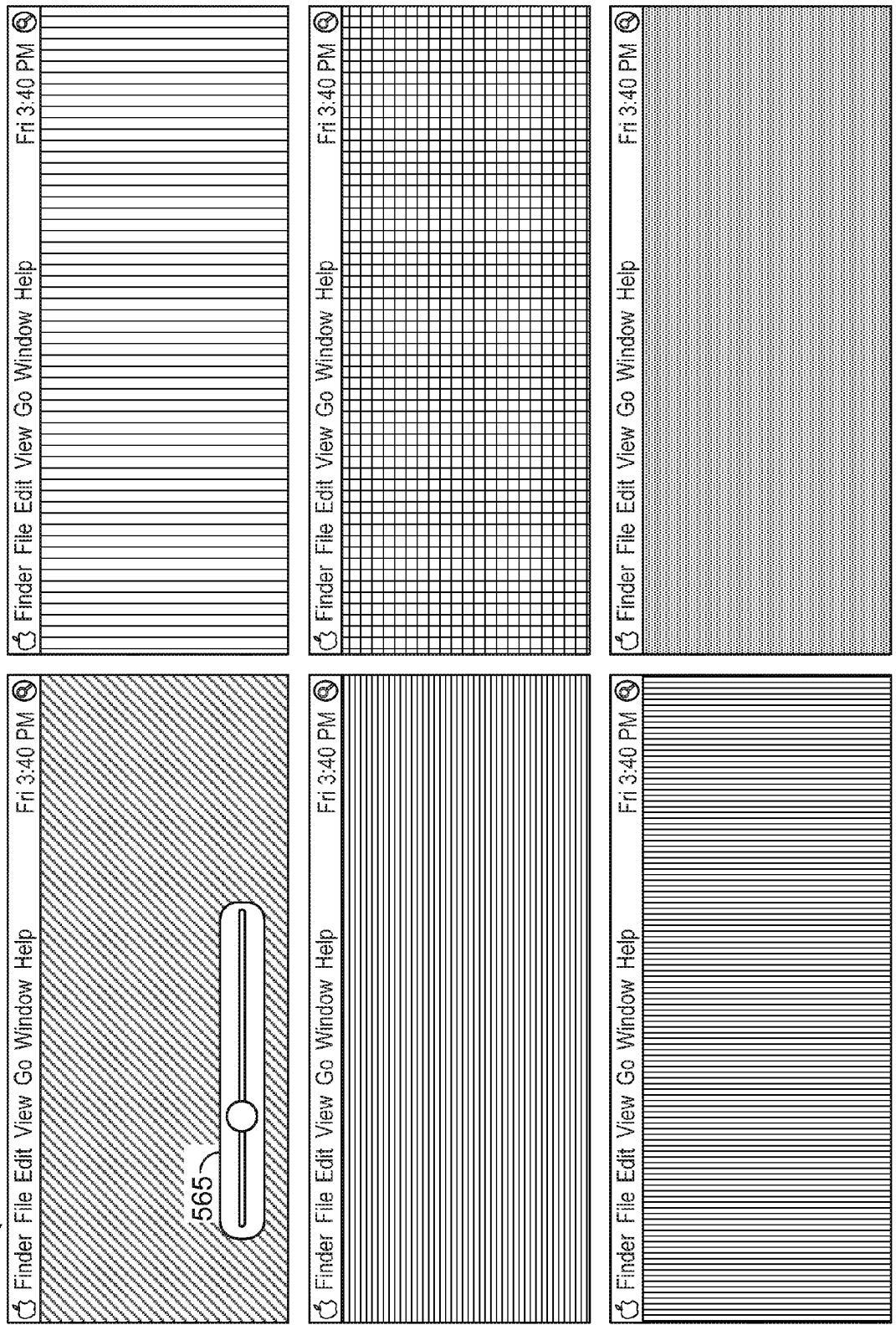

FIGS. 5A-5B illustrate screenshots of a user interface for configuring the plot in FIG. 4A by example. In some implementations, the shape of the curve used to describe the opacity of a user interface element given a particular background area can be derived through empirical data samples. For convenience, the process 500 will be described with reference to a system that performs the process 500. The system identifies a sequence of varying backgrounds (step 505). For example, the varying backgrounds 530 can have a broad range of values for the characteristic feature being used to determine opacity. For example, some of the backgrounds can be relatively bright, while others are relatively dark and yet others have other varying degrees of brightness. In sequence, for each of the various backgrounds, the system presents the background with an example user interface element (step 510). The user interface element can initially be presented with a default or predetermined opacity value. The system receives user input for interactively adjusting the opacity value of the user interface element (step 515). For example, the user can use the keyboard to increase or decrease the opacity value of the element. As user input is received the opacity value of the element is updated so that the user may observe the effect of the opacity adjustment. In some implementations, a user interface control element 565 (e.g., a slider or a spinner control) can be presented for receiving user input. The system can receive user input indicating that the user is satisfied with the present opacity value at which point the next background is presented and the user again selects a desired opacity value for the next background. The system uses the respective opacity values selected by the user and the characteristic feature of each background as empirical data to derive a curve (step 525). For example, the plot 570 shows six empirical data points 575A-F, each corresponding to a particular opacity value and a particular background brightness value. The curve 580 is derived from the points based on any convenient curve fitting technique. The system can then use the derived curve for determining an opacity value given any background (e.g., not just the various backgrounds initially identified by the system in step 505).

Figure 6:
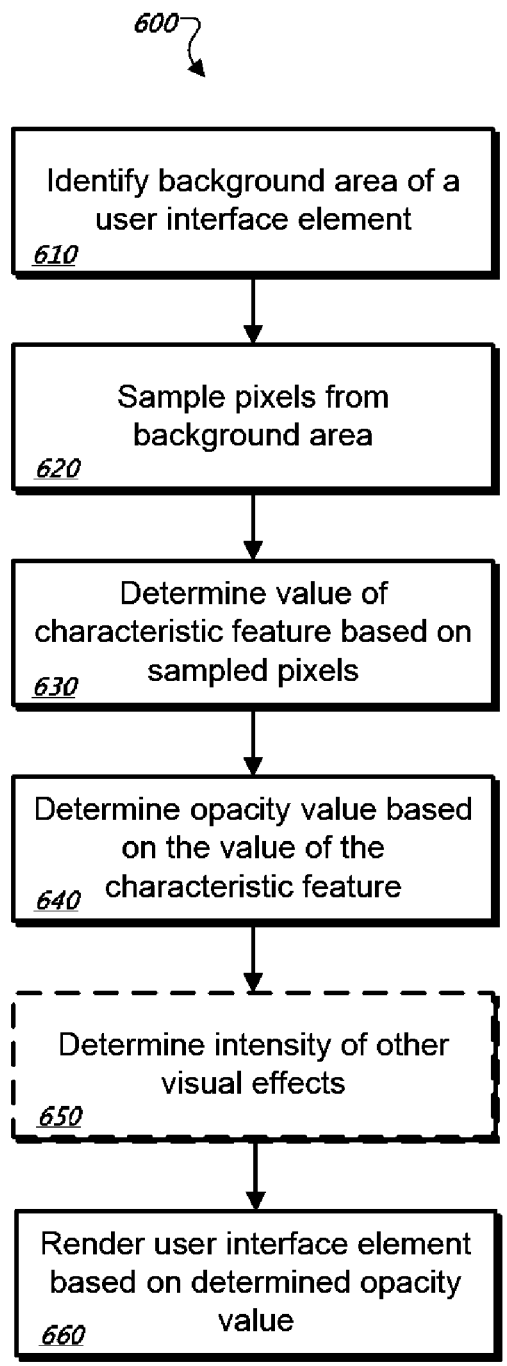
FIG. 6 is an example flow diagram of a process for adjusting the opacity of a user interface element based on a characteristic feature of a background.

FIG. 6 is an example flow diagram of a process 600 for adjusting the opacity of a user interface element based on a characteristic feature of a background area. For convenience, the process 600 will be described with reference to a system that performs the process 600. The system identifies the background area over which the user interface element will be drawn (step 610). Pixels within the identified area are sampled (step 620). In some implementations, the background area is the desktop background of the graphical user interface. In other implementations, the background area can include other user interface elements depicted in the user interface. For example, a semi-transparent user interface element can be drawn over other user interface elements such that the other user interface elements are partly visible through the semi-transparent user interface element being drawn.

The system uses the samples to determine the value (or set of values or function that can be used to derive a local value) of the characteristic feature of the background area (step 630). For example, if the characteristic feature is brightness, the color values of each of the sampled pixels can be, for example, averaged together to determine an average brightness for the background area. The system uses the value of the characteristic feature to determine an opacity value for the user interface element (step 640). In some implementations, a function (or a curve, such as the described in reference to FIG. 4A) is used to map the characteristic feature value to an opacity value. In other implementations, multiple values that characteristic features of the background area can be used. For example, a range of color values, brightness, saturation or complexity for separate areas (e.g., individual pixels) of the background area can be used to determine an opacity value. In still other implementations, multiple characteristic feature values can be used. For example, both the brightness and the complexity of the background area can be identified and used to determine an opacity value for the user interface element.

Optionally, the system can use the value of the characteristic feature or the value of a spatial feature of the user interface element to determine the intensity of other visual effects (e.g., color dodge) that can affect the visual appearance of the user interface element (step 650). For example, a gradient effect using color dodge or color burn can be used to further effect the visual appearance of the user interface element.

The system renders the user interface element by blending the user interface element according to the determined opacity value (step 660). In some implementations the blending and rendering of the user interface element or individual layers of the user interface element can be facilitated by a graphics sub-system. The graphics sub-system can include a combination of software modules and hardware components for rendering graphical primitives. These graphics sub-systems are generally accessible through application programming interfaces (API) such as the Core Image API, OpenGL® or DirectX®.

Figure 7:
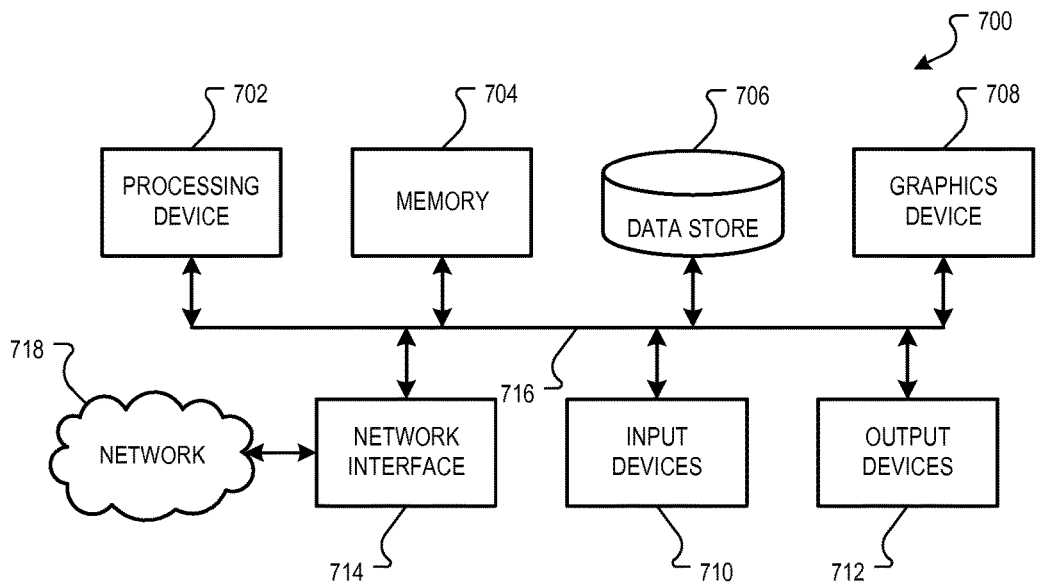
FIG. 7 is a diagram of an example system.

FIG. 7 is a block diagram of an example system 700 that can be utilized to implement the systems and methods described herein. The system 700 can, for example, be implemented in a computer device, such as any one of the personal computer devices available from Apple Inc., or other personal computer devices. Other example implementations can also include video processing devices, multimedia processing devices, portable computing devices, etc.

The example system 700 includes a processing device 702, a first data store 704, a second data store 706, a graphics device 708, input devices 710, output devices 712, and a network device 714. A bus system 716, such as a data bus and a motherboard, can be used to establish and control data communication between the components 702, 704, 706, 708, 710, 712 and 714. Other example system architectures, however, can also be used.

The processing device 702 can, for example, include one or more microprocessors. The first data store 704 can, for example, include a random access memory storage device, such as a dynamic random access memory, or other types of computer-readable medium memory devices. The second data store 706 can, for example, include one or more hard drives, a flash memory, and/or a read only memory, or other types of computer-readable medium memory devices.

The graphics device 708 can, for example, include a video card, a graphics accelerator card, or a display adapter, and is configured to generate and output images to a display device. In one implementation, the graphics device 708 can be realized in a dedicated hardware card connected to the bus system 716. In another implementation, the graphics device 708 can be realized in a graphics controller integrated into a chipset of the bus system 716. Other implementations can also be used.

Example input devices 710 can include a keyboard, a mouse, a stylus, a video camera, etc., and example output devices 712 can include a display device, an audio device, etc.

The network interface 714 can, for example, include a wired or wireless network device operable to communicate data to and from a network 718. The network 718 can include one or more local area networks (LANs) or a wide area network (WAN), such as the Internet.

In an implementation, the system 700 includes instructions defining an operating system stored in the first data store 704 and/or the second data store 706. Example operating systems can include the MAC OS® X series operating system, the WINDOWS® based operating system, or other operating systems. Upon execution of the operating system instructions, access to various system objects is enabled. Example system objects include data files, applications, functions, windows, etc. To facilitate an intuitive user experience, the system 700 includes a graphical user interface that provides the user access to the various system objects and conveys information about the system 700 to the user in an intuitive manner.

Figure 8:
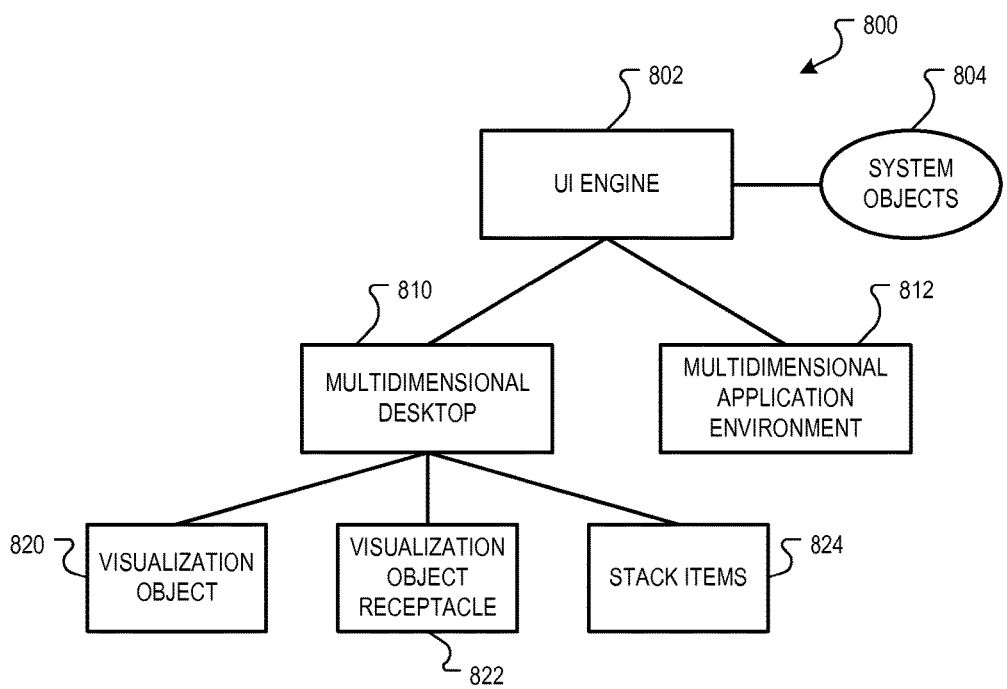
FIG. 8 is a block diagram of an example user interface architecture.

FIG. 8 is a block diagram of an example user interface architecture 800. The user interface architecture 800 includes a user interface (UI) engine 802 that provides the user access to the various system objects 804 and conveys information about the system 700 to the user.

Upon execution, the UI engine 802 can cause the graphics device 708 to generate a graphical user interface on an output device 712, such as a display device. In one implementation, the graphical user interface can include a multidimensional desktop 810 and a multidimensional application environment 812. In an implementation, the multidimensional desktop 810 and the multidimensional application environment 812 includes x-, y- and z-axis aspects, e.g., a height, width and depth aspect. The x-, y- and z-axis aspects may define a three-dimensional environment, e.g., a "3D" or "2.5D" environment that includes a z-axis, e.g., depth, aspect.

In an implementation, the multidimensional desktop 810 can include icons 820, an icon receptacle 822, and stack items 824. The icons 820, the icon receptacle 822 and the stack items 824 can be presented in the three dimensional environment as graphical objects having a depth aspect.

In an implementation, the multidimensional application environment 812 can include an application environment distributed along a depth aspect. For example, a content frame, e.g., an application window, can be presented on a first surface, and control elements, e.g., toolbar commands, can be presented on a second surface.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method comprising:
   increasing an intensity of a visual effect to be applied to a user interface element to be rendered over a background area based on a characteristic feature of the background area, the characteristic feature of the background area being based on color values for a sample of pixels from the background area, wherein the characteristic feature of the background area comprises brightness, and wherein the characteristic feature is distinct from the visual effect; and
   rendering the user interface element based on the increased intensity of the visual effect.

2. The method of claim 1, further comprising:
   sampling pixels from the background area; and
   determining a value of the characteristic feature of the background area based on the sampled pixels.

3. The method of claim 2, wherein the characteristic feature of the background area further comprises one or more of:
   an average color of the background area;
   a histogram describing color frequencies in the background area; or
   gradients describing color complexity of the background area.

4. The method of claim 1, wherein the visual effect is opacity.

5. The method of claim 1, wherein increasing the intensity of the visual effect comprises:
   using a function to determine the intensity of the visual effect based on a determined value of the characteristic feature.

6. The method of claim 5, further comprising:
   deriving the function from a plurality of user-specified empirical data samples.

7. A system, comprising:
   memory;
   one or more processors; and
   instructions stored in the memory and configured for execution by the one or more processors, the instructions comprising instructions that when executed cause the one or more processors to:
   increase an intensity of a visual effect to be applied to a user interface element to be rendered over a background area based on a characteristic feature of the background area, the characteristic feature of the background area being based on color values for a sample of pixels from the background area, wherein the characteristic feature of the background area comprises brightness, and wherein the characteristic feature is distinct from the visual effect; and
   render the user interface element based on the increased intensity of the visual effect.

8. A non-transitory computer-readable medium, on which are stored instructions, comprising instructions that when executed cause a data processing apparatus to:
   increase an intensity of a visual effect to be applied to a user interface element to be rendered over a background area based on a characteristic feature of the background area, the characteristic feature of the background area being based on color values for a sample of pixels from the background area, wherein the characteristic feature of the background area comprises brightness, and wherein the characteristic feature is distinct from the visual effect; and
   render the user interface element based on the increased intensity of the visual effect.

9. The computer-readable medium of claim 8, wherein the instructions further comprise instructions that when executed cause the data processing apparatus to:
   sample pixels from the background area; and
   determine a value of the characteristic feature of the background area based on the sampled pixels.

10. The computer-readable medium of claim 9, wherein the characteristic feature of the background area further comprises one or more of:
    an average color of the background area;
    a histogram describing color frequencies in the background area; or
    gradients describing color complexity of the background area.

11. The computer-readable medium of claim 8, wherein the visual effect is opacity.

12. The computer-readable medium of claim 8, wherein the instructions that when executed cause the data processing apparatus to increase the intensity of the visual effect comprise instructions that when executed cause the data processing apparatus to:
    use a function to determine the intensity of the visual effect based on a determined value of the characteristic feature.

13. The computer-readable medium of claim 12, wherein the instruction stored thereon further comprise instructions that when executed cause the data processing apparatus to:
    derive the function from a plurality of user-specified empirical data samples.

14. A computer-implemented method, comprising:
    presenting a plurality of backgrounds, each of the backgrounds having a respective value for a characteristic feature;
    for each of the presented backgrounds:
        presenting a user interface element with the presented background; and
        receiving user input adjusting an opacity value of the user interface element,
            wherein the user input may increase or decrease the opacity value; and
    deriving an opacity curve for the plurality of backgrounds using the respective opacity values and the respective characteristic feature values, wherein the opacity values are distinct from the characteristic feature values.

15. The method of claim 14, further comprising, for each of the presented backgrounds, updating the presented user interface element to reflect the adjusted opacity value.

16. The method of claim 14, wherein the characteristic feature is brightness.

17. The method of claim 14, wherein presenting a user interface element with the respective presented background comprises presenting the user interface element with a predetermined opacity value.

18. A computer-implemented method, comprising:
- identifying a background area of a graphical user interface over which a user interface element is to be rendered;
- sampling pixels within the background area;
- using the sampled pixels to determine a brightness value of the background area over which the user interface element is to be rendered, wherein the brightness value is determined based on color values of each of the sampled pixels;
- increasing an opacity value of the user interface element based on the brightness value; and
- rendering the user interface element over the background area of the graphical user interface based on the increased opacity value.

\* \* \* \* \*